United States Patent [19]

O'Phelan et al.

[11] Patent Number: 6,110,233

[45] Date of Patent: Aug. 29, 2000

[54] WOUND MULTI-ANODE ELECTROLYTIC CAPACITOR WITH OFFSET ANODES

[75] Inventors: Michael J. O'Phelan, Oakdale; Robert R. Tong, Fridley; James M. Poplett, Golden Valley, all of Minn.

[73] Assignee: Cardiac Pacemakers, Inc., St. Paul, Minn.

[21] Appl. No.: 09/076,023

[22] Filed: May 11, 1998

[51] Int. Cl.[7] .......................... H01G 9/00; H01G 9/004; H01G 9/02; A61N 1/39; A61N 1/375
[52] U.S. Cl. .............................. 29/25.03; 429/94; 607/5
[58] Field of Search ..................... 607/5, 36, 7; 429/94; 29/25.03

[56] References Cited

U.S. PATENT DOCUMENTS

| | | |
|---|---|---|
| 3,765,956 | 10/1973 | Li . |
| 4,136,435 | 1/1979 | Li . |
| 4,371,406 | 2/1983 | Li . |
| 4,395,305 | 7/1983 | Whitman . |
| 4,690,714 | 9/1987 | Li . |
| 4,782,235 | 11/1988 | Lejeune et al. . |
| 4,907,130 | 3/1990 | Boulloy et al. . |
| 4,944,300 | 7/1990 | Saksena . |
| 5,055,889 | 10/1991 | Beall . |
| 5,086,374 | 2/1992 | MacFarlane et al. ............. 361/525 |
| 5,131,388 | 7/1992 | Pless et al. . |
| 5,245,499 | 9/1993 | Senes . |
| 5,370,663 | 12/1994 | Lin ............................... 607/5 |
| 5,439,760 | 8/1995 | Howard et al. .................. 429/94 |
| 5,468,984 | 11/1995 | Efland et al. . |
| 5,500,534 | 3/1996 | Robinson et al. . |
| 5,536,960 | 7/1996 | Hayaski . |
| 5,536,964 | 7/1996 | Green et al. . |
| 5,584,890 | 12/1996 | MacFarlane et al. ............. 29/25.03 |
| 5,597,658 | 1/1997 | Kejha ............................. 424/94 |
| 5,628,801 | 5/1997 | MacFarlane et al. ............. 29/25.03 |
| 5,642,252 | 6/1997 | Sakamoto et al. . |
| 5,660,737 | 8/1997 | Elias et al. . |
| 5,661,625 | 8/1997 | Yang . |
| 5,661,629 | 8/1997 | MacFarlane et al. ............. 361/505 |
| 5,677,539 | 10/1997 | Apotovsky et al. . |
| 5,688,698 | 11/1997 | Robinson et al. . |
| 5,698,453 | 12/1997 | Green et al. . |
| 5,711,861 | 1/1998 | Ward et al. . |
| 5,728,594 | 3/1998 | Efland et al. . |
| 5,748,439 | 5/1998 | MacFarlane et al. ............. 361/525 |
| 5,808,857 | 9/1998 | Stevens . |
| 5,814,082 | 9/1998 | Fayram et al. . |
| 5,837,995 | 11/1998 | Chow et al. . |
| 5,859,456 | 1/1999 | Efland et al. . |
| 5,895,416 | 4/1999 | Barreras, Sr. et al. . |
| 5,895,733 | 4/1999 | Crespi et al. .................... 429/219 |
| 5,904,514 | 5/1999 | Konuma et al. . |
| 5,930,109 | 7/1999 | Fishler . |
| 5,949,638 | 9/1999 | Greenwood et al. ............. 361/508 |
| 5,959,535 | 9/1999 | Remsburg . |
| 5,963,418 | 10/1999 | Greenwood et al. . |
| 5,983,472 | 11/1999 | Fayram et al. . |

FOREIGN PATENT DOCUMENTS

| | | | |
|---|---|---|---|
| 3-296207 | 12/1991 | Japan ........................ H01G 9/04 |
| 5-251283 | 9/1993 | Japan ........................ H01G 9/04 |
| 9219343 | 8/1997 | Japan ........................ H01G 9/048 |

OTHER PUBLICATIONS

"Understanding Aluminum Electrolytic Capacitors", technical notes, United Chemi–Con, 7 pgs (publication date unknown).

Moynihan, J.D., et al., "Theory, Design and Application of Electrolytic Capacitors", treatise, 136 pgs. (1982).

*Primary Examiner*—Carl H. Layno
*Attorney, Agent, or Firm*—Schwegman, Lundberg, Woessner & Kluth, P.A.

[57] ABSTRACT

A wound multi-anodic electrolytic capacitor has a multi-anode stack of strips of high foil gain tunnel-etched aluminum. Inner end edges the anodes in a multi-anode stack are offset from each other by a predetermined distance. Offsetting the end edges of the anodes advantageously reduces mechanical stresses in the capacitor windings. This increases the reliability of the capacitor and advantageously allows a smaller diameter mandrel opening, increasing the energy density per unit volume of the capacitor and allowing its volume to be reduced. When used in an implantable defibrillator or other cardiac rhythm management device, the smaller capacitor advantageously reduces its volume or, alternatively, allows the use of a larger battery, thereby prolonging its useable life.

24 Claims, 5 Drawing Sheets

WOUND MULTI-ANODE ELECTROLYTIC CAPACITOR WITH OFFSET ANODES

CROSS-REFERENCE TO RELATED APPLICATION

This application is related to O'Phelan et al., U.S. patent application Ser. No. 09/063,692, entitled "ELECTROLYTIC CAPACITOR AND MULTI-ANODIC ATTACHMENT," which was filed on Apr. 21, 1998, and assigned to the assignee of the present invention, the entirety of which is incorporated herein by reference.

TECHNICAL FIELD OF THE INVENTION

This invention relates generally to capacitors and particularly, but not by way of limitation, to a wound multi-anodic electrolytic capacitor with offset anodes.

BACKGROUND OF THE INVENTION

Capacitors are electrical components that store electrical energy in an electromagnetic field between electrodes that are separated by a dielectric insulator. Each electrode carries a charge that is opposite in polarity to the charge on the other electrode. Capacitors find many applications in a wide variety of electric circuits. Some applications require the capacitor to withstand a high voltage between its electrodes. For example, some camera flash devices produce light by an electric discharge in a gas. A high voltage is required to create the discharge. A power converter transforms a low voltage obtained from a battery into a high voltage, which is stored on the capacitor and used to trigger the flash. In another example, external and implantable defibrillators deliver a high voltage electrical countershock to the heart. The countershock restores the heart's rhythm during cardiac arrhythmias such as life-threatening ventricular fibrillation. In an implantable defibrillator, a power converter transforms a low voltage (e.g., approximately 3.25 Volts), obtained from a battery, into a high voltage (e.g., approximately 750 Volts), which is stored on capacitors and used to defibrillate the heart.

Electrolytic capacitors are used in cameras, defibrillators, and for other electric circuit applications. An electrolytic capacitor includes two electrodes: an anode and a cathode. The dielectric insulator between the anode and cathode is formed by anodizing the anode electrode (i.e., growing an oxide on the anode). The anode and cathode electrodes are physically separated from each other by a porous separator that is soaked with a conductive electrolyte solution. The electrolyte acts as a part of the cathode electrode. A parallel plate capacitor is formed by a substantially parallel planar arrangement of superjacent anode and cathode plates. A separator is interposed in between the anode and cathode electrode plates. A cylindrical capacitor is formed by winding anode, cathode, and separator strips into a spiraled cylindrical roll. For electrically connecting the capacitor in an electric circuit, tabs are joined to the anode and cathode. The tabs protrude outwardly from an end of the cylinder so that the capacitor can be connected in the electric circuit.

By maximizing the energy density of a capacitor, its volume can be reduced. This is particularly important for implantable medical devices, such as implantable defibrillators, since the defibrillation energy storage capacitor occupies a significant portion of the implantable defibrillator device. Smaller implantable defibrillator devices are desired. Smaller defibrillators are easier to implant in a patient. Also, for a particular defibrillator size, a smaller capacitor allows the use of a larger battery, which increases the effective usable life of the implanted device before surgical replacement is required. Thus, one goal of implantable defibrillator design is to maximize capacitor energy density and minimize capacitor volume.

The energy density of a capacitor increases in proportion to a corresponding increase in the surface area of the anode. For example, an anode having a particular macroscopic surface area can be roughened to increase its microscopic surface area. The capacitance per unit of macroscopic surface area, which is sometimes referred to as the foil gain of the capacitor, increases as a result of roughening techniques. One such roughening technique includes tunnel-etching tiny openings partially or completely through the anode electrode strip. However, tunnel-etched electrodes are extremely brittle, making the anodes extremely susceptible to mechanical stresses, such as those stresses resulting from winding electrodes and separators into a cylindrical capacitor. Anode surface area is further increased by stacking multiple tunnel-etched anodes, thereby obtaining even more surface area and, in turn, an even capacitance per unit area of the anode stack. However, in such multi-anodic capacitors, stacking the anodes further increases the stresses resulting from winding the electrodes and separators into a cylindrical capacitor.

Thus, there is a need for further reducing capacitor volume, increasing capacitor reliability, and reducing cost and complexity of the capacitor manufacturing process, for wound multi-anodic electrolytic capacitors used in implantable defibrillators, camera photoflashes, and other electric circuit applications.

SUMMARY OF THE INVENTION

The above-mentioned shortcomings, disadvantages and problems are addressed by the present invention, which will be understood by reading and studying the following specification. The present invention provides, among other things, a wound capacitor. The capacitor includes a first anode, including an end edge, a cathode, and a first separator between the first anode and the cathode. The first separator carries an electrolyte. A second electrode, which also includes an end edge, is substantially adjacent to the first anode. The first anode is in between the second anode and the first separator. A second separator is substantially adjacent to the cathode. The cathode is in between the first and second separators. The second separator is approximately adjacent to the second anode when wound. The first and second anodes, the first and second separators, and the cathode are spirally wound together into a cylindrical capacitor defining a concentric cylindrical axis. The end edges of the first and second anodes are approximately proximal to the cylindrical axis. The first and second anodes extend spirally outward from the end edges of the respective first and second anodes. The end edge of the first anode is offset from the end edge of the second anode by a first predetermined distance.

In one embodiment, the invention provides a cardiac rhythm management system including the above-described capacitor. The cardiac rhythm management system includes an implantable defibrillator, which includes the capacitor, and a leadwire that is adapted to be coupled to a heart for delivering an electrical countershock energy that is stored on the capacitor.

In various embodiments, the first predetermined distance is approximately between 1 millimeter and 10 millimeters. In one embodiment, the capacitor also includes a third anode. The third anode is substantially adjacent to the second anode. The second and third anodes are in between the second separator and the first anode when wound. The third anode is in between the second anode and the second separator when wound. The third anode is spirally wound together with the first and second anodes. The third anode includes an end edge that is approximately proximal to the cylindrical axis such that the third anode extends spirally outward from the end edge of the third anode. The end edge of the third anode is offset from the end edge of the second anode by a second predetermined distance. In one embodiment, the second predetermined distance is approximately between 1 millimeter and 10 millimeters. A mandrel opening extends through the capacitor along the concentric cylindrical axis. The mandrel opening includes a diameter that is approximately between 1 millimeter and 5 millimeters.

In another embodiment, the present invention provides, among other things, a spirally wound cylindrical aluminum electrolytic capacitor. The capacitor includes a tunnel-etched aluminum first anode ribbon having an end edge. Also included is an aluminum cathode ribbon. Also included is a first separator ribbon including at least two paper ribbons impregnated with a liquid electrolyte. Also included is a tunnel-etched aluminum second anode ribbon including an end edge. Also included is a second separator ribbon including at least two paper ribbons impregnated with a liquid electrolyte. The first and second anode ribbons, the first and second separator ribbons, and the cathode ribbon are spirally wound together into a cylindrical capacitor defining a concentric cylindrical axis. Each winding of the cylindrical capacitor includes a stacked sequence of the second separator ribbon, the cathode ribbon, the first separator ribbon, the first anode ribbon, and the second anode ribbon. The end edges of the first and second anode ribbons are approximately parallel to each other and are also approximately parallel and approximately proximal to the cylindrical axis. The end edge of the first anode ribbon is offset from the end edge of the second anode ribbon by a first predetermined distance.

Another aspect of the invention provides, among other things, a method of fabricating a capacitor. A stacked sequence of elements is formed. The stacked sequence of elements sequentially includes a second separator, a cathode, a first separator, a first anode, and a second anode, each having an end being approximately aligned with the other elements in the stacked sequence. The end of the first anode is displaced from the end of the second anode by a first predetermined distance. The stacked sequence is wound spirally outward from the ends of the stacked sequence of elements to form a resulting cylindrical capacitor. The ends of the stacked sequence of elements are approximately proximal to a concentric cylindrical axis of the capacitor.

In various further embodiments, the method includes displacing the end of the first anode from the end of the second anode includes offsetting the first and second anodes by approximately between 1 millimeter and 10 millimeters. A mandrel opening is formed to extend through the capacitor along the concentric cylindrical axis, the mandrel opening including a diameter that is approximately between 1 millimeter and 5 millimeters.

In another embodiment, the present invention provides, among other things, a method of fabricating a capacitor. The method includes forming a stacked sequence of elements that sequentially includes a second separator, a cathode, a first separator, a first anode, a second anode, and a third anode, each having an end being approximately aligned with the other elements in the stacked sequence. The first anode is displaced from the end of the second anode by a first predetermined distance. The second anode is displaced from the end of the third anode by a second predetermined distance. The stacked sequence is wound spirally outward from the ends of the stacked sequence of elements to form a resulting cylindrical capacitor, such that the ends of the stacked sequence of elements are approximately proximal to a concentric cylindrical axis of the capacitor.

In various further embodiments, the method includes displacing the end of the first anode from the end of the second anode includes offsetting the first and second anodes by approximately between 1 millimeter and 10 millimeters. The end of the second anode is displaced from the end of the third anode by an offset that is approximately between 1 millimeter and 10 millimeters. Winding the stacked sequence includes forming a mandrel opening extending through the capacitor along the concentric cylindrical axis, the mandrel opening including a diameter that is approximately between 1 millimeter and 5 millimeters.

Thus, the present invention provides, among other things, a wound multi-anodic electrolytic capacitor. Inner end edges of anodes in a multi-anode stack are offset from each other by a predetermined distance. Offsetting the end edges of the anodes advantageously reduces mechanical stresses in the capacitor windings. This increases the reliability of the capacitor and allows a smaller diameter mandrel opening, increasing the energy density per unit volume of the capacitor and allowing its volume to be reduced. When used in an implantable cardiac rhythm management device, the smaller capacitor advantageously reduces the volume of the implantable device or, alternatively, allows the use of a larger battery, thereby prolonging its useable life. Other advantages will become apparent upon reading the following detailed description of the invention and viewing the accompanying drawings that form a part thereof.

BRIEF DESCRIPTION OF THE DRAWINGS

In the drawings, like numerals describe substantially similar components throughout the several views. Shapes and dimensions are not critical unless indicated as such in the drawing or the accompanying detailed description of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

The present invention provides, among other things, a wound multi-anodic electrolytic capacitor. Inner end edges of anodes in a multi-anode stack are offset from each other by a predetermined distance. Offsetting the end edges of the anodes reduces mechanical stresses in the capacitor windings. This increases the reliability of the capacitor and allows a smaller diameter mandrel opening, increasing the energy density per unit volume of the capacitor and allowing its volume to be reduced. When used in an implantable cardiac rhythm management device, the smaller capacitor reduces the volume of the implantable device or, alternatively, allows the use of a larger battery, thereby prolonging its useable life. Other advantages will also become apparent upon reading the following detailed description of the invention and viewing the accompanying drawings that form a part thereof.

Figure 1:
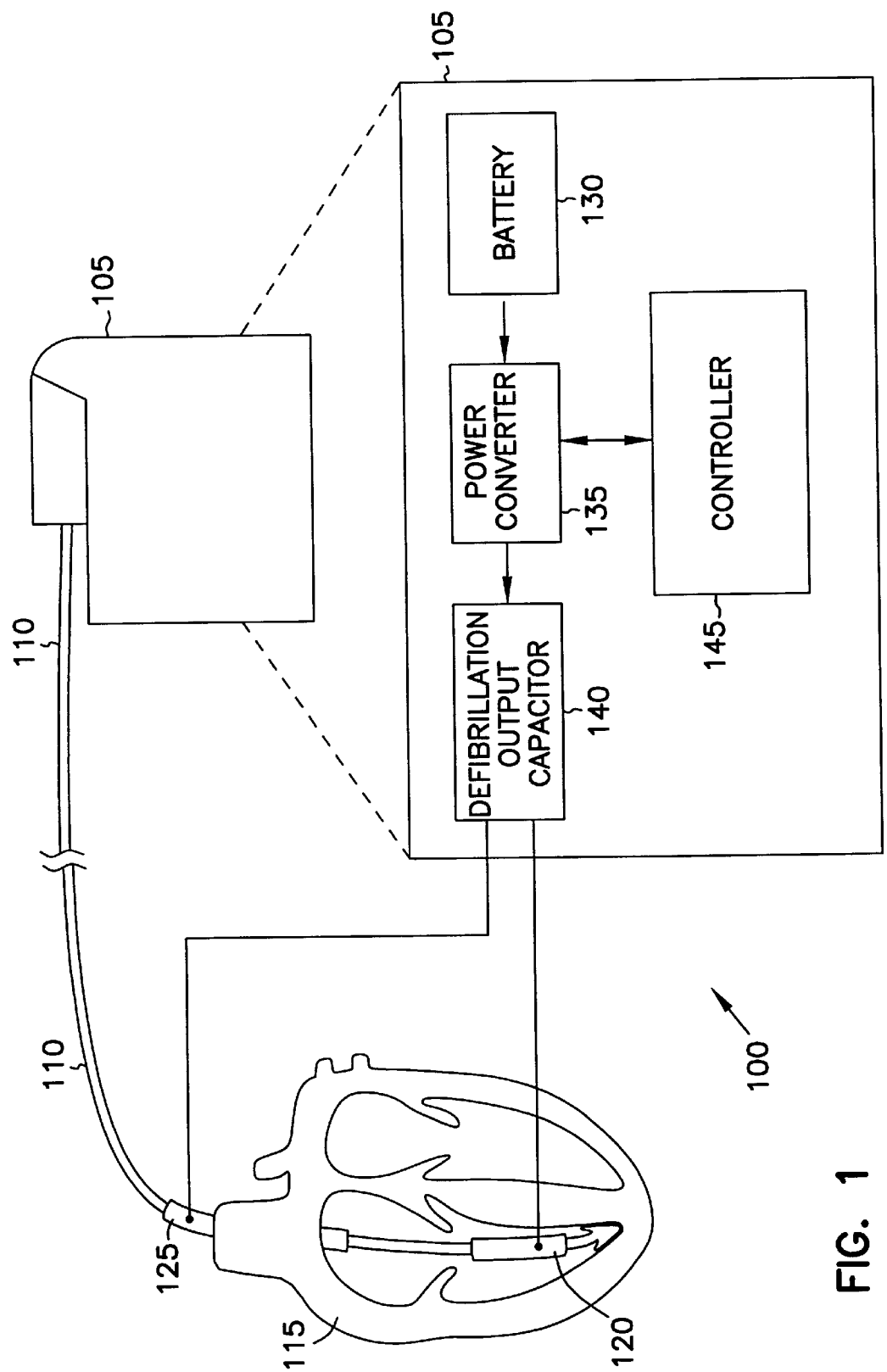
FIG. 1 is a schematic/block diagram illustrating generally one embodiment of a cardiac rhythm management system.

FIG. 1 is a schematic/block diagram illustrating generally, by way of example, but not by way of limitation, one embodiment of a cardiac rhythm management system 100 according to one aspect of the present invention. System 100 includes, among other things, cardiac rhythm management device 105 and leadwire ("lead") 110 for communicating signals between device 105 and a portion of a living organism, such as heart 115. In the illustrated example, device 105 includes an automatic implantable cardioverter/defibrillator (AICD), but any other apparatus for cardiac rhythm management is also included within the present invention.

In the illustrated embodiment, portions of system 100 is implantable in the living organism, such as in a pectoral or abdominal region of a human patient, or elsewhere. In another embodiment, portions of system 100 (e.g., device 105) are alternatively disposed externally to the human patient. In the illustrated embodiment, portions of lead 110 are disposed in the right ventricle, however, any other positioning of lead 110 is included within the present invention. In one embodiment, lead 110 is a commercially available endocardial defibrillation lead. System 100 can also include other leads in addition to lead 110, appropriately disposed, such as in or around heart 115, or elsewhere.

In one example, a first conductor of multiconductor lead 110 electrically couples a first electrode 120 to device 105. A second conductor of multiconductor lead 110 independently electrically couples a second electrode 125 to device 105. Device 105 includes an energy source, such as battery 130, a power converter 135, such as a flyback converter, at least one defibrillation output capacitor 140, and a controller 145 for controlling the operation of device 105. In one embodiment, power converter 135 transforms the terminal voltage of battery 130, which is approximately between 2 Volts and 3.25 Volts, into an approximately 700–800 Volt (maximum) defibrillation output energy pulse stored on the defibrillation output capacitor 140. In another embodiment, power converter 135 transforms the terminal voltage of two series-coupled batteries, which is approximately between 4 Volts and 6.25 Volts, into the approximately 700–800 Volt (maximum) defibrillation output energy pulse stored on the defibrillation output capacitor 140. It is understood that the present invention is also capable of operating using lower defibrillation energies (e.g., approximately between 0.1–40 Joules) and voltages (e.g., approximately between 10–800 Volts).

Figure 2A:
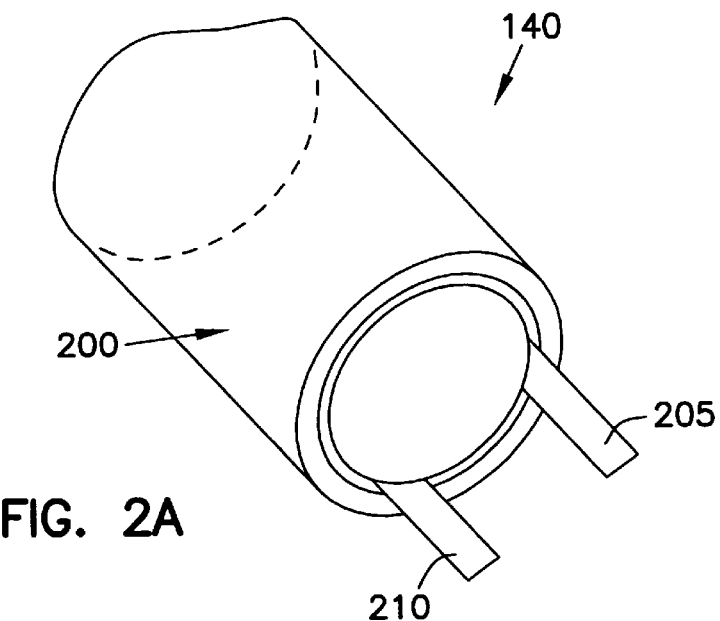
FIG. 2A illustrates generally one embodiment of a cylindrical capacitor.

FIG. 2A illustrates generally, by way of example, but not by way of limitation, one embodiment of a cylindrical capacitor 140. In one embodiment, capacitor 140 includes a case 200 for carrying, enclosing, or sealing a spirally wound aluminum electrolytic capacitor, as described below. Anode connection tab 205 and cathode connection tab 210 provide electrical access to respective anode and cathode terminals of capacitor 140, as described below. In one embodiment, attachment of tabs 205 and 210 is as described in O'Phelan et al., U.S. patent application Ser. No. 09/063,692, entitled "ELECTROLYTIC CAPACITOR AND MULTI-ANODIC ATTACHMENT," which was filed on Apr. 21, 1998, and assigned to the assignee of the present invention, the entirety of which is incorporated herein by reference. Other techniques of attaching tabs 205 and 210 are also included in the present invention.

Figure 2B:
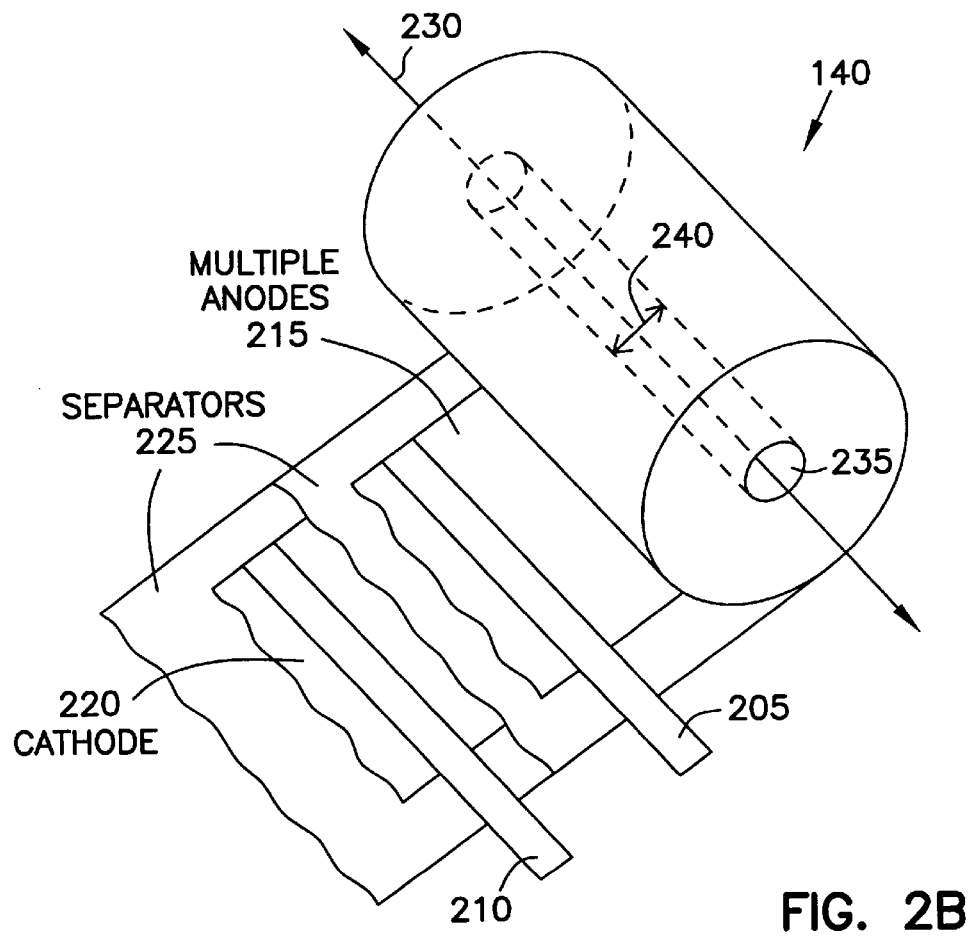
FIG. 2B illustrates generally one embodiment of a partially unrolled portions of a cylindrical capacitor.

FIG. 2B illustrates generally, by way of example, but not by way of limitation, one embodiment of a partially unrolled portions of a cylindrical aluminum electrolytic capacitor 140. Anode connection tab 205 physically and electrically contacts portions of at least one anode of multiple anode stack 215, which is a ribbon or strip that forms a first electrode of capacitor 140. Cathode connection tab 210 physically and electrically contacts portions of cathode 220, which is a ribbon or strip that forms a second electrode of capacitor 140. One or more separators 225 on each side of cathode 220 provides physical separation between cathode 220 and anode stack 215 when spirally rolled up together into a cylindrically shaped capacitor 140. In one embodiment, each of separators 225 includes one or more paper strips. For example, using two paper strips obtains redundancy that better protects against anode-to-cathode short-circuits in the event of pinholes in the paper strips. In one embodiment, permeable separators 225 carry a conductive electrolyte that, together with cathode strip 220 and cathode connection tab 210, forms the second electrode (i.e., a cathode electrode) of capacitor 140. However, the present invention is not limited to use only in capacitors using a liquid conductive electrolyte (e.g., a solid electrolyte could also be used).

In FIG. 2B, the multiple anodes 215, separators 225, and cathode 220 are spirally wound around a mandrel into a cylindrical capacitor 140 defining a concentric cylindrical axis 230. The mandrel is removed, resulting in a mandrel opening 235 extending through capacitor 140 along cylindrical axis 230. According to one aspect of the invention, the mandrel opening 235 has a diameter 240 that is approximately between 1 millimeter and 5 millimeters (e.g., approximately 2.5 millimeters). As discussed below, the present invention allows, among other things, a smaller diameter 240 of mandrel opening 235 in comparison to conventional cylindrically wound capacitors. The smaller mandrel opening 235 increases the energy density per unit volume of capacitor 140. The higher energy density allows the volume of capacitor 140 to be reduced. This, in turn, allows reduction of the volume of implantable device 105 or, alternatively, allows the use of a larger battery 130, thereby increasing the implanted longevity of implantable device 105.

Figure 3:
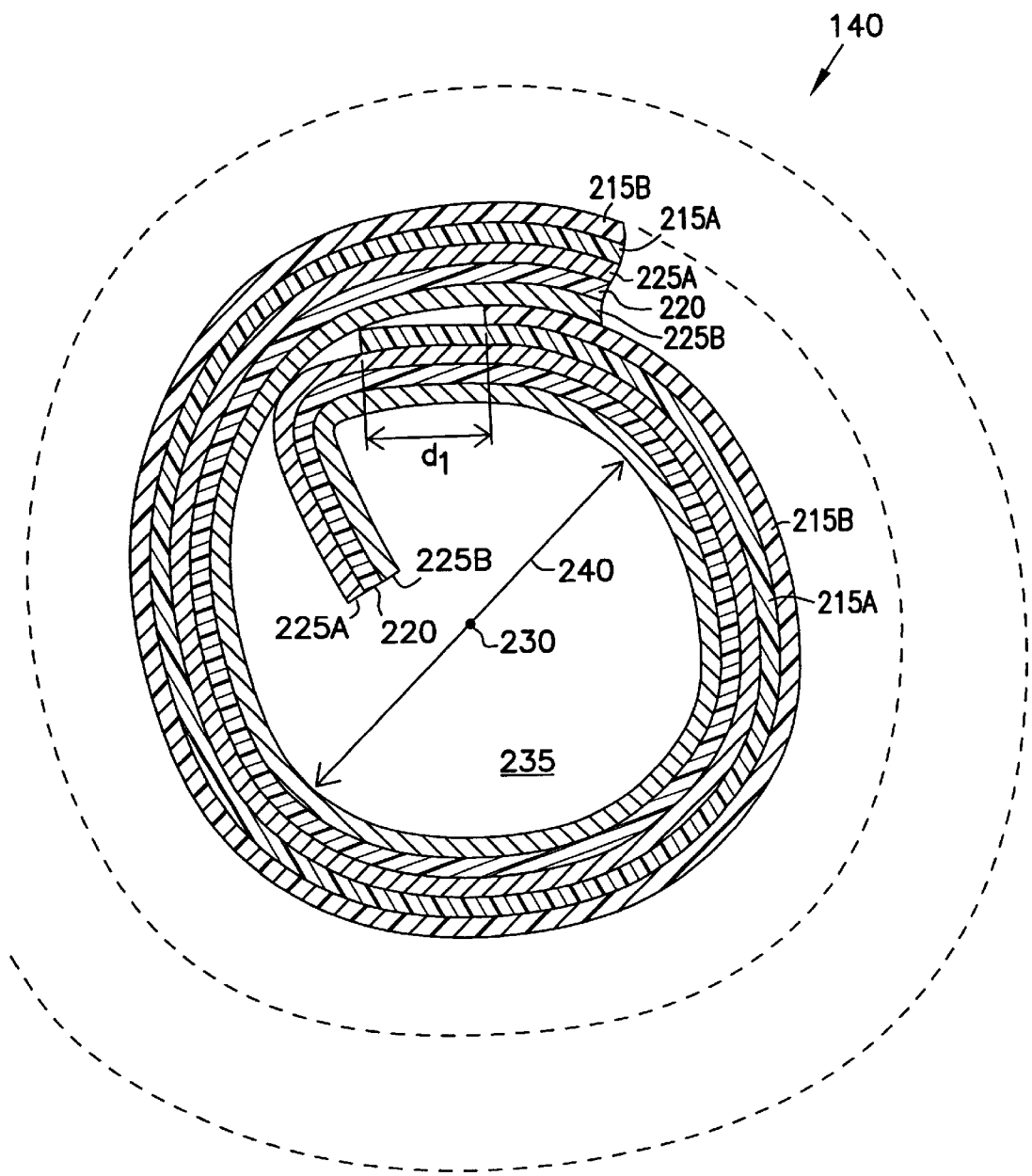
FIG. 3 is a schematic diagram illustrating generally a cross-sectional view of one embodiment of a portion of a cylindrical capacitor.

FIG. 3 is a schematic diagram illustrating generally, by way of example, but not by way of limitation, a cross-sectional view of one embodiment of a portion of capacitor 140. Cathode 220 is separated from anode stack 215 by separators 225A–B. Anode stack 215 includes a stacked configuration of multiple anodes, such as first anode 215A and second anode 215B (or optionally including even more anodes). In one embodiment, each of anodes 215A–B is a high foil-gain tunnel-etched aluminum foil strip that has been anodized (i.e., a thin insulating aluminum oxide layer has been grown on each surface of each of the aluminum foil anodes 215A–B). The tunnel-etched anodes 215A–B are extremely brittle, making them extremely susceptible to mechanical stresses, such as those stresses resulting from winding the cylindrical capacitor 140. The aluminum oxide layer formed on first anode 215A provides a capacitor dielectric between first anode 215A and the conductive electrolyte carried by first separator 225A. The aluminum oxide layer formed on second anode 215B provides a capacitor dielectric between second anode 215B and the conductive electrolyte carried by second separator 225B when spirally wound as illustrated in FIG. 3.

FIG. 3 illustrates one embodiment of how first anode 215A, second anode 215B, first separator 225A, second separator 225B, and cathode 220 are spirally wound together into a cylindrical capacitor 140, defining a concentric cylindrical axis 230. Each winding of the cylindrical capacitor 140 includes a stacked sequence (in a direction outward from cylindrical axis 230) of second separator 225B, cathode 220, first separator 225A, first anode 215A, and second anode 215B. Because of the spiral winding arrangement, the sequence is repeated for windings that are more distal from the cylindrical axis 230. That is, in the above sequence, second anode 215B is again followed by second separator 225B, cathode 220, etc. Because the sequence is repeated, the relationship between the elements is significant, not the choice of starting and ending elements in describing the sequence.

According to one aspect of the invention, each of first anode 215A and second anode 215B include an end edge that is proximal to cylindrical axis 235 and mandrel opening 235, such that first anode 215A and second anode 215B extend spirally outward from their respective end edges. In one embodiment, the end edges of first anode 215A and second anode 215B are approximately parallel to each other. The end edge of first anode 215A is offset from the end edge of second anode 215B by a first predetermined distance $d_1$, as illustrated in FIG. 3. The distance $d_1$, is selected to be approximately between 1 millimeter and 10 millimeters (e.g., approximately between 5 millimeters and 7 millimeters). Offsetting the end edges of first anode 215A and second anode 215B obtains reduced winding stresses in the windings that are further away from the cylindrical axis 230. Thus, this aspect of the invention advantageously increases the reliability of capacitor 140. As discussed above, the reduced winding stresses also allows mandrel opening 235 to have a smaller diameter 240. This increases the energy density per unit volume of capacitor 140. For example, reducing the diameter 240 of mandrel opening 235 from 4 millimeters to approximately 2.5 millimeters advantageously increases the energy density of capacitor 140 by approximately 5%. The higher energy density allows the volume of capacitor 140 to be reduced. This, in turn, allows reduction of the volume of implantable device 105 or, alternatively, allows a larger battery 130, thereby increasing the implanted longevity of implantable device 105.

Figure 4:
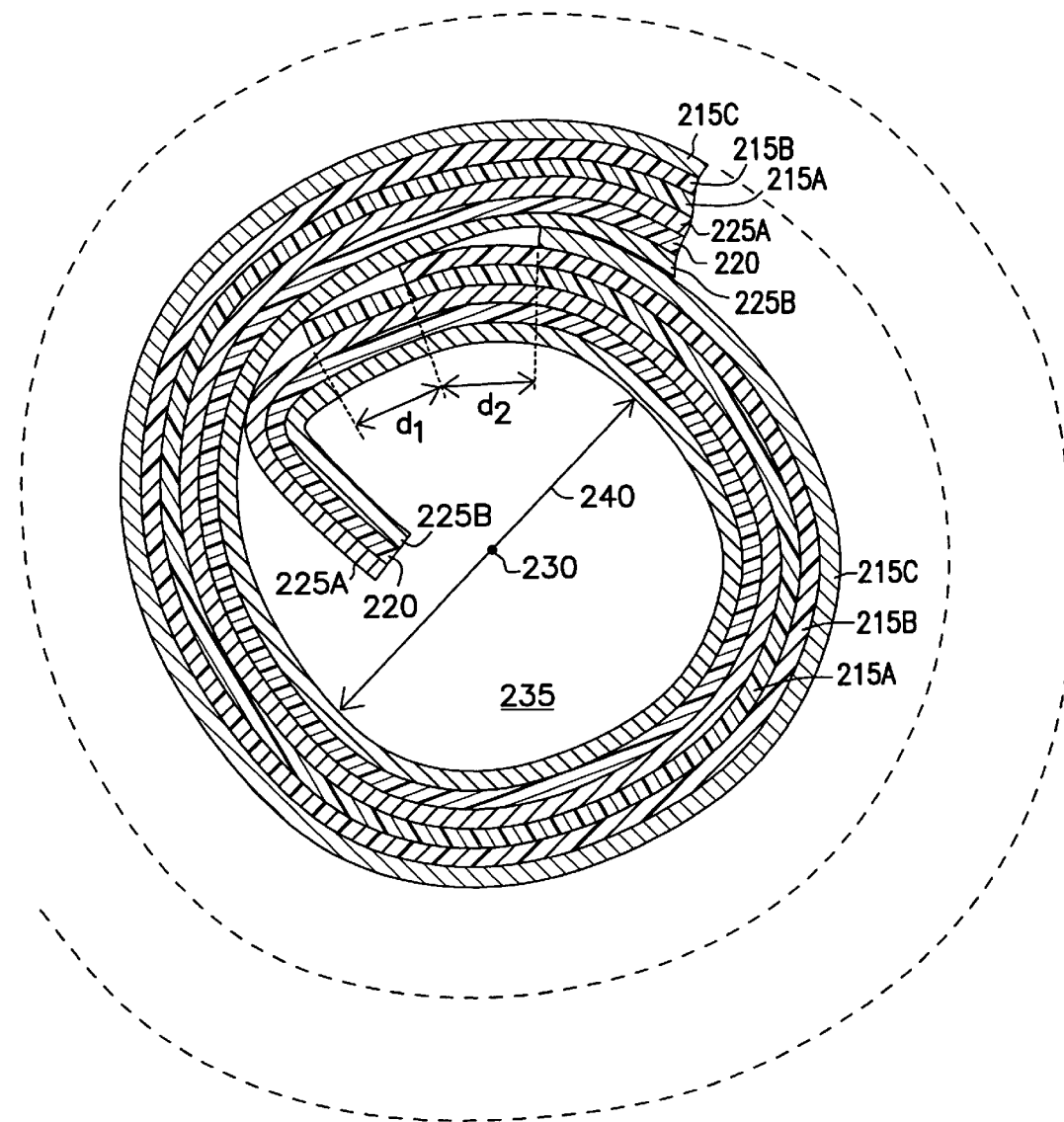
FIG. 4 is a schematic diagram illustrating generally a cross-sectional view of another embodiment of a portion of a cylindrical capacitor.

FIG. 4 is a schematic diagram illustrating generally, by way of example, but not by way of limitation, a cross-sectional view of one embodiment of a portion of capacitor 140. FIG. 4 is similar to FIG. 3, but further including a third anode 215C, which is wound in between second anode 215B and second separator 225B, as illustrated in FIG. 4. According to one aspect of the invention, each of first anode 215A, second anode 215B, and third anode 215C include an end edge that is proximal to cylindrical axis 235 and mandrel opening 235. First anode 215A, second anode 215B, and third anode 215C each extend spirally outward from their respective end edges. In one embodiment, the end edges of first anode 215A, second anode 215B, and third anode 215C are approximately parallel to each other. The end edge of first anode 215A is offset from the end edge of second anode 215B by a first predetermined distance $d_1$, as described above. The end edge of the second anode 215B is offset from the end edge of third anode 215C by a second predetermined distance $d_2$, as illustrated in FIG. 4. The distance $d_2$ is selected to be approximately between 1 millimeter and 10 millimeters (e.g., approximately between 5 millimeters and 7 millimeters). Offsetting the end edges of second anode 215B and third anode 215C obtains reduced winding stresses in the capacitor windings that are further away from the cylindrical axis 230, as discussed above with respect to FIG. 3. Although FIGS. 3 and 4 illustrate embodiments of the invention having 2 anodes and 3 anodes, respectively, the present invention includes the use of additional anodes, being offset from each other in a similar fashion.

Example Method of Forming Cylindrical Capacitor

Figure 5:
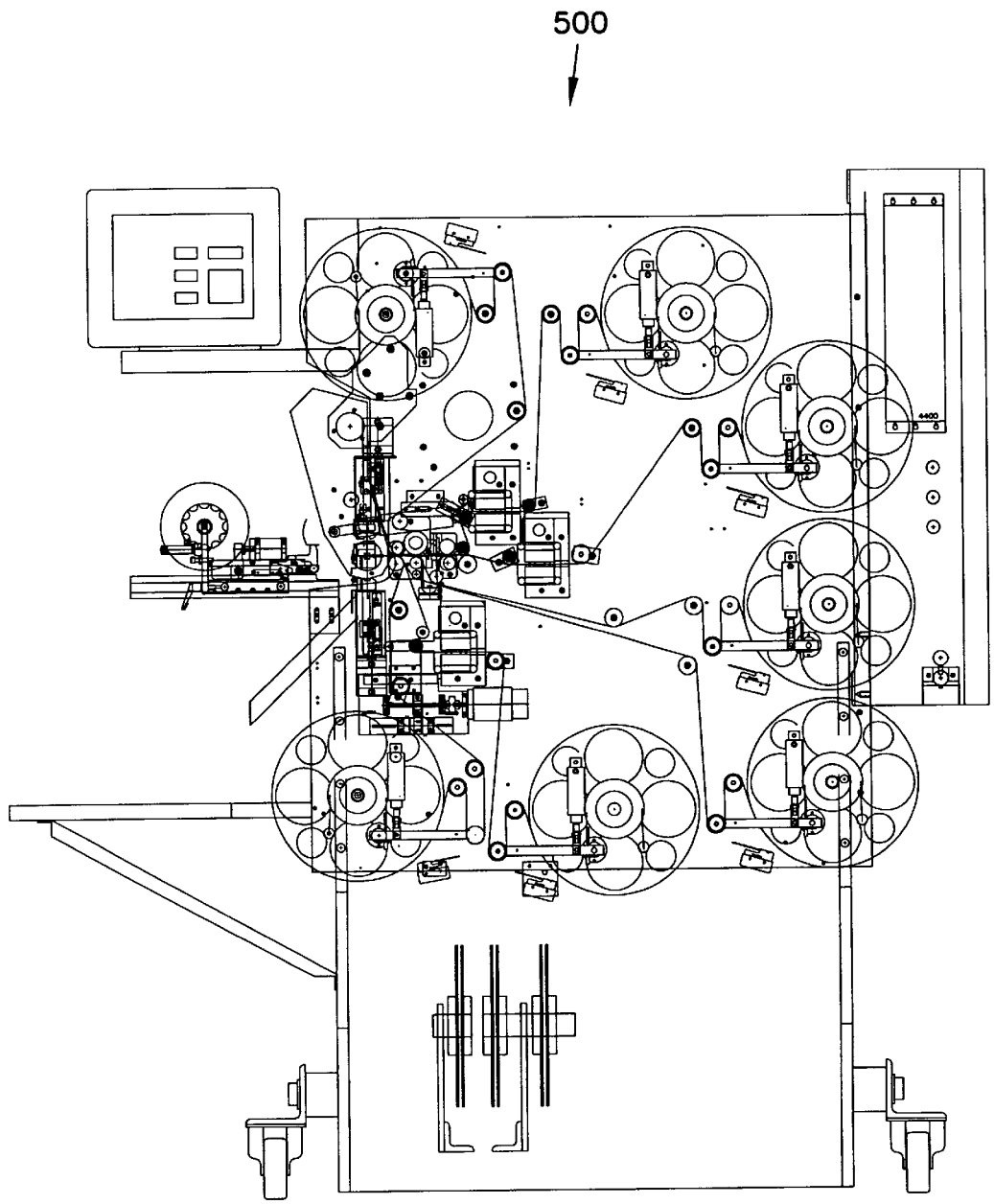
FIG. 5 is a schematic diagram that illustrates generally one example embodiment of a capacitor winder.

FIGS. 2 through 4 illustrate various embodiments of portions of the present invention providing a cylindrical capacitor 140, as discussed above. In one example, the cylindrical capacitor 140 is formed by spiral winding using a capacitor winder apparatus. FIG. 5 is a schematic diagram that illustrates generally one example embodiment of such a capacitor winder 500. In FIG. 5, capacitor winder 500 is a Model 820 dual anode lug capacitor winder available from Micro Tech Manufacturing, Inc. of Worcester, Mass. As illustrated, the capacitor winder 500 is capable of forming a cylindrical capacitor 140 having only 2 anodes in anode stack 215. In one embodiment of the present invention, an anode stack 215 having 2 anodes is provided and, in one embodiment, the end edges of the anodes are manually offset from each other. However, as discussed above, certain embodiments of the present invention utilize more than 2 anodes in anode stack 215. According to one technique of making one embodiment of the present invention, additional anode strips are trimmed to size, and the trimmed anode strips are manually inserted between the dual anode ribbons that are fed by reels on capacitor winder 500. In one embodiment, the end edges of the anodes are manually offset from each other. This provides an anode stack 215, which includes more than two anodes, in the resulting cylindrically wound capacitor 140. Alternatively, capacitor winder 500 can be modified. Additional reels and feeders can be added to supply the additional anode ribbons for forming a capacitor 140 having an anode stack 215 that includes more than 2 anodes.

In one embodiment, by way of example, but not by way of limitation, the anode stack 215 includes 3 anode layers 215A–C (as illustrated in FIG. 4). Each one of anode layers 215A–C formed of a tunnel-etched oxidized aluminum foil ribbon having a width of approximately 24 millimeters and a thickness of approximately 0.0041 inches. The cathode 220 is formed from an aluminum foil ribbon having a width of approximately 24 millimeters and a thickness of approximately 0.0012 inches. Each separator 225A and 225B includes two layers of a paper ribbon, each having a width of 27 millimeters and a thickness of approximately between 12.7 and 20 microns. Anode stack 215, cathode 220, and paper separators 225A–B are cut to a desired length to obtain a particular capacitance value of capacitor 140. In one embodiment, the wound capacitor 140 has a cylindrical diameter of approximately 14.5 millimeters, and is held together (i.e., prevented from unwinding) by wrapping in an adhesive tape having a width of approximately 26.6 microns and a thickness of approximately 53 microns.

In one embodiment, anode tab 205 is only joined to a single anode in anode stack 215 for obtaining an electrical connection to other anodes in anode stack 215, as described in O'Phelan et al., U.S. patent application Ser. No. 09/063,692 entitled "ELECTROLYTIC CAPACITOR AND MULTI-ANODIC ATTACHMENT," (Attorney Docket. No. 00279.094US1), which was filed on Apr. 21, 1998, and assigned to the assignee of the present invention, the entirety of which is incorporated herein by reference.

CONCLUSION

Thus, the present invention provides, among other things, a wound multi-anodic electrolytic capacitor. Inner end edges of anodes in a multi-anode stack are offset from each other by a predetermined distance. Offsetting the end edges of the anodes advantageously reduces mechanical stresses in the capacitor windings. This increases the reliability of the capacitor and advantageously allows a smaller diameter mandrel opening, increasing the energy density per unit volume of the capacitor and allowing its volume to be reduced. When used in an implantable cardiac rhythm management device, the smaller capacitor advantageously reduces the volume of the implantable device or, alternatively, allows the use of a larger battery, thereby prolonging its useable life.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A wound capacitor, comprising:
   a first anode, including an end edge;
   a cathode;
   a first separator between the first anode and the cathode, the first separator carrying an electrolyte;
   a second anode, substantially adjacent to the first anode, the first anode being in between the second anode and the first separator, the second anode including an end edge;
   a second separator substantially adjacent to the cathode, the cathode being in between the first and second separators, the second separator being approximately adjacent to the second anode when wound; and
   wherein the first and second anodes, the first and second separators, and the cathode are spirally wound together into a cylindrical capacitor defining a concentric cylindrical axis, the end edges of the first and second anodes being approximately proximal to the cylindrical axis such that the first and second anodes extend spirally outward from the end edges of the respective first and second anodes, the end edge of the first anode being offset from the end edge of the second anode by a first predetermined distance.

2. The capacitor of claim 1, in which the first predetermined distance is approximately between 1 millimeter and 10 millimeters.

3. The capacitor of claim 1, further comprising a third anode, substantially adjacent to the second anode, the second and third anodes being in between the second separator and the first anode when wound, the third anode being in between the second anode and the second separator when wound, the third anode being spirally wound together with the first and second anodes.

4. The capacitor of claim 3, wherein the third anode includes an end edge that is approximately proximal to the cylindrical axis such that the third anode extends spirally outward from the end edge of the third anode, the end edge of the third anode being offset from the end edge of the second anode by a second predetermined distance.

5. The capacitor of claim 4, in which the second predetermined distance is approximately between 1 millimeter and 10 millimeters.

6. The capacitor of claim 1, further comprising a mandrel opening extending through the capacitor along the concentric cylindrical axis, the mandrel opening including a diameter that is approximately between 1 millimeter and 5 millimeters.

7. The wound capacitor of claim 1, where the first anode and the second anode are etched anodes.

8. The wound capacitor of claim 1, wherein the end edges of the first and second anodes are approximately proximal to each other.

9. A cardiac rhythm management system comprising:
   a pulse generator including a capacitor wherein the capacitor includes:
   a first anode, including an end edge;
   a cathode;
   a first separator between the first anode and the cathode, the first separator carrying an electrolyte;
   a second anode, substantially adjacent to the first anode, the first anode being in between the second anode and the first separator, the second anode including an end edge;
   a second separator substantially adjacent to the cathode, the cathode being in between the first and second separators, the second separator being approximately adjacent to the second anode when wound; and
   wherein the first and second anodes, the first and second separators, and the cathode are spirally wound together into a cylindrical capacitor defining a concentric cylindrical axis, the end edges of the first and second anodes being approximately proximal to the cylindrical axis such that the first and second anodes extend spirally outward from the end edges of the respective first and second anodes, the end edge of the first anode being offset from the end edge of the second anode by a first predetermined distance.

10. The cardiac rhythm management system of claim 9, further comprising an implantable defibrillator, and a lead-wire that is adapted to be coupled to a heart to deliver an electrical countershock using energy stored on the capacitor.

11. A spirally wound cylindrical aluminum electrolytic capacitor comprising:
    a tunnel-etched aluminum first anode ribbon including an end edge;
    an aluminum cathode ribbon;
    a first separator ribbon including at least two paper ribbons impregnated with a liquid electrolyte;
    a tunnel-etched aluminum second anode ribbon including an end edge;

a second separator ribbon including at least two paper ribbons impregnated with a liquid electrolyte; and wherein the first and second anode ribbons, the first and second separator ribbons, and the cathode ribbon are spirally wound together into a cylindrical capacitor defining a concentric cylindrical axis, each winding of the cylindrical capacitor including a stacked sequence of the second separator ribbon, the cathode ribbon, the first separator ribbon, the first anode ribbon, and the second anode ribbon, and the end edges of the first and second anode ribbons being approximately parallel to each other and also being approximately parallel and approximately proximal to the cylindrical axis, the end edge of the first anode ribbon being offset from the end edge of the second anode ribbon by a first predetermined distance.

12. The capacitor of claim 11, in which the first predetermined distance is approximately between 1 millimeter and 10 millimeters.

13. The capacitor of claim 11, further comprising a third anode ribbon being spirally wound together with the first and second anodes, wherein each winding of the cylindrical capacitor includes a stacked sequence of the second separator ribbon, the cathode ribbon, the first separator ribbon, the first anode ribbon, the second anode ribbon, and the third anode ribbon, and the end edges of the second and third anode ribbons being approximately parallel to each other and also being approximately parallel and approximately proximal to the cylindrical axis, the end edge of the second anode ribbon being offset from the end edge of the third anode ribbon by a second predetermined distance.

14. The capacitor of claim 13, in which the second predetermined distance is approximately between 1 millimeter and 10 millimeters.

15. The capacitor of claim 11, further comprising a mandrel opening extending through the capacitor along the concentric cylindrical axis, the mandrel opening including a diameter that is approximately between 1 millimeter and 5 millimeters.

16. A cardiac rhythm management system comprising:
   a pulse generator including a capacitor wherein the capacitor includes:
      a tunnel-etched aluminum first anode ribbon including an end edge;
      an aluminum cathode ribbon;
      a first separator ribbon including at least two paper ribbons impregnated with a liquid electrolyte;
      a tunnel-etched aluminum second anode ribbon including an end edge;
      a second separator ribbon including at least two paper ribbons impregnated with a liquid electrolyte; and
      wherein the first and second anode ribbons, the first and second separator ribbons, and the cathode ribbons are spirally wound together into a cylindrical capacitor defining a concentric cylindrical axis, each winding of the cylindrical capacitor including a stacked sequence of the second separator ribbon, the cathode ribbon, the first separator ribbon, the first anode ribbon, and the second anode ribbon, and the end edges of the first and second anode ribbons being approximately parallel to each other and also being approximately parallel and approximately proximal to the cylindrical axis, the end edge of the first anode ribbon being offset from the end edge of the second anode ribbon by a first predetermined distance.

17. The cardiac rhythm management system of claim 16, further comprising an implantable defibrillator, and a lead wire that is adapted to be coupled to a heart to deliver an electrical countershock using energy stored on the capacitor.

18. A method of fabricating a capacitor, the method comprising:
   forming a stacked sequence of elements that sequentially includes a second separator, a cathode, a first separator, a first anode, and a second anode, each having an end being approximately aligned with the other elements in the stacked sequence;
   displacing the end of the first anode from the end of the second anode by a first predetermined distance; and
   winding the stacked sequence spirally outward from the ends of the stacked sequence of elements to form a resulting cylindrical capacitor, such that the ends of the stacked sequence of elements are approximately proximal to a concentric cylindrical axis of the capacitor.

19. The method of claim 18, in which displacing the end of the first anode from the end of the second anode includes offsetting the first and second anodes by approximately between 1 millimeter and 10 millimeters.

20. The method of claim 18, in which winding the stacked sequence includes forming a mandrel opening extending through the capacitor along the concentric cylindrical axis, the mandrel opening including a diameter that is approximately between 1 millimeter and 5 millimeters.

21. A method of fabricating a capacitor, the method comprising:
   forming a stacked sequence of elements that sequentially includes a second separator, a cathode, a first separator, a first anode, a second anode, and a third anode, each having an end being approximately aligned with the other elements in the stacked sequence;
   displacing the end of the first anode from the end of the second anode by a first predetermined distance;
   displacing the end of the second anode from the end of the third anode by a second predetermined distance; and
   winding the stacked sequence spirally outward from the ends of the stacked sequence of elements to form a resulting cylindrical capacitor, such that the ends of the stacked sequence of elements are approximately proximal to a concentric cylindrical axis of the capacitor.

22. The method of claim 21, in which displacing the end of the first anode from the end of the second anode includes offsetting the first and second anodes by approximately between 1 millimeter and 10 millimeters.

23. The method of claim 22, in which displacing the end of the second anode from the end of the third anode includes offsetting the second and third anodes by approximately between 1 millimeter and 10 millimeters.

24. The method of claim 22, in which winding the stacked sequence includes forming a mandrel opening extending through the capacitor along the concentric cylindrical axis, the mandrel opening including a diameter that is approximately between 1 millimeter and 5 millimeters.

* * * * *